United States Patent [19]

Remus

[11] Patent Number: 4,769,162

[45] Date of Patent: Sep. 6, 1988

[54] CONVEYOR LUBRICANT COMPRISING AN ANIONIC SURFACTANT AND A WATER-SOLUBLE ALUMINUM SALT

[75] Inventor: Christian A. Remus, Detroit, Mich.

[73] Assignee: Diversey Wyandotte Corporation, Wyandotte, Mich.

[21] Appl. No.: 62,116

[22] Filed: Jun. 12, 1987

[51] Int. Cl.⁴ .......................................... C10M 173/02
[52] U.S. Cl. ...................................... 252/18; 252/49.3
[58] Field of Search ................................. 252/18, 49.3

[56] References Cited

U.S. PATENT DOCUMENTS

| | | | |
|---|---|---|---|
| 3,215,630 | 11/1965 | Compton et al. | 252/18 |
| 3,860,521 | 1/1975 | Aepli et al. | 252/42.1 |
| 4,274,973 | 6/1981 | Stanton et al. | 252/33.6 |
| 4,604,220 | 8/1986 | Stanton | 252/49.3 |

Primary Examiner—William R. Dixon, Jr.
Assistant Examiner—Jerry D. Johnson
Attorney, Agent, or Firm—Arnold S. Weintraub

[57] ABSTRACT

A water soluble lubricant concentrate adapted to be admixed with water and a lubricant composition made therefrom which exhibit enhanced levels of lubricity and hard water stability and facilitate the transportation of containers on a conveyor. The concentrate and composition include:

(a) an anionic surfactant selected from the group consisting of alpha olefin sulfonates, sulfonates of ethoxylated alcohols, alkyl aryl sulfonates, napthalene sulfonates and mixtures thereof;

(b) a carrier for the anionic surfactant; and (c) a water soluble salt of aluminum selected from the group consisting of aluminum sulfate, aluminum nitrate, aluminum chloride, polyhydrates of potassium aluminum sulfate/aluminum sulfate complexes and mixtures thereof.

22 Claims, 2 Drawing Sheets

CONVEYOR LUBRICANT COMPRISING AN ANIONIC SURFACTANT AND A WATER-SOLUBLE ALUMINUM SALT

BACKGROUND OF THE INVENTION

1. Field of the Invention

The present invention relates to conveyor lubricants. More particularly, the present invention concerns the use of combinations of aluminum salts and anionic surfactants as conveyor lubricants. Even more particularly, the present invention concerns conveyor lubricants and concentrates thereof suitable for use with hard water. These conveyor lubricants and concentrates thereof, more particularly, contain aluminum salts, and fatty acids.

2. Description of Relevant Art

In breweries, soft drink bottling operations and food processing plants, conveyors are used to move the bottles, jars, cans and the like along the line. In order to keep the conveyor chains clean and to provide lubrication, it is customary to use a lubricant such as an aqueous soap-based lubricant. The compositions, also, include chelating agents to prevent precipitation of calcium and magnesium soaps. These lubricants are, generally, manufactured and sold as concentrates which must, then, be diluted to, in general, about 1:100 with tap water at the point of use.

There has been a constant search for greater lubricity in such compositions. It can readily be appreciated that increased lubricity will be highly advantageous in that it will aid movement of the units along the conveyor lines and prevent wear on both the units to be moved and the line itself.

Various additives have been proposed in compositions to aid and enhance lubricity. Fatty acids and various soaps have been employed in such compositions. However, fatty acid lubricants have not been readily adopted as additives for a variety of reasons.

Furthermore, while the art has readily accepted the use of water-soluble soaps as lubricants, they too, have certain disadvantages. First, when a soap is dissolved in hard water, it will precipitate as the calcium or magnesium salt of the fatty acid. This precipitation problem is further aggravated if free fatty acids are present in the lubricant. The precipitate thus formed creates an undesirable greasy-type film. This film is difficult to remove and attracts dirt, dust and grime; all of which are highly undesirable in food handling equipment.

In order to overcome these disadvantages, various lubricant compositions have been proposed. In U.S. Pat. No. 4,604,220 to Stanton, the use of anionic surfactants selected from the group consisting of $C_{12}$ to $C_{18}$ alpha olefin sulfonates and mixtures thereof in lubricant concentrates. This addition resulted in improved lubricity on conveyors handling aluminum containers. However, such lubricant concentrates and compositions are significantly less effective with conveyors handling glass containers or containers manufactured from polymers such as polyethylene terephthalate than other conventional lubricants.

Additionally, conveyor lubricants such as those disclosed in the Stanton reference do not exhibit high levels of hard-water stability.

Thus, it is desirable to provide a lubricant concentrate and lubricant composition which provide enhanced lubricity; particularly when conveying glass or PET containers. It is also desirable to provide a lubricant concentrate and composition which are highly stable in the presence of hard water.

SUMMARY OF THE INVENTION

The present invention is predicated upon the unexpected discovery that aluminum salt could be incorporated in conveyor-type lubricants containing certain anionic surfactants. It is further predicated upon the unexpected discovery that the combination of aluminum salts and anionic surfactants would provide greater lubricity than generally found in conventional soap-based lubricants or those which incorporate anionic surfactants such as the alpha-olefin sulfonates.

It was further unexpectedly discovered that the use of aluminum salts in such lubricants improved the hard-water stability of the lubricant without requiring the addition of hard-water sensitizers. The phenomenon is particularly marked when aluminum salts are employed with an anionic surfactant selected from the group consisting of alpha-olefin sulfonates, alkyl aryl sulfonates, alcohol ethoxylated sulfonates, naphthalene sulfonates, and mixtures thereof.

Finally, it was unexpectedly discovered that the addition of aluminum salts to the conveyor lubricant containing anionic surfactants and/or fatty acids would retard or prevent precipitation of fatty acids in the presence of metallic salts such as are particularly found in hard-water.

The present invention provides a concentration for forming a conveyor lubricant as well as the conveyor lubricant per se. The water-soluble lubricant concentrate includes the following components:

(a) an anionic surfactant selected from the group consisting of $C_{12}$ to $C_{18}$ alpha olefin sulfonates, sulfonates of ethoxylated alcohols, alkyl aryl sulfonates, naphthalene sulfonates, and mixtures thereof;

(b) a carrier for the surfactant selected from the group consisting of water, water-soluble solvents, and mixtures thereof; and (c) a salt of aluminum selected from the group consisting of aluminum sulfate, aluminum nitrate, aluminum chloride, polyhydrates of mixed salts such as potassium aluminum sulfate/aluminum sulfate, and mixtures thereof.

Generally, the concentrate will contain from about 2 to about 50 percent by weight of the anionic surfactant. The aluminum salt will be present in an amount from about 0.5 to about 15 percent by weight, based on the total weight of the concentrate.

The balance of the concentrate will, generally, be comprised of a carrier for the anionic surfactant and the aluminum salt. This carrier is, generally, water. However, water soluble solvents such as alkanols, polyhydric alcohols and the like may be admixed with the surfactant, in lieu of water. Alternately, the concentrate may contain water and solvent. Likewise, adjuvants, such as surfactants, corrosion inhibitors, and the like may be admixed with the concentrate.

The dilute lubricant composition is formed by diluting the concentrate with water in a respective ratio of from about 1 part concentrate to about 50 parts water to 1 part of concentrate to about 1000 parts water.

The concentrate may also contain fatty acids as lubricity enhancers. Where fatty acids are employed in the concentrate, they are generally present in an amount between about 0.1 and about 10.0 percent by weight based on the total weight of the concentrate. Preferably, the fatty acid is present in an amount between about 0.1 and about 1.5 percent, based on the weight of the surfactant. The fatty acid is, preferably, a carboxylic acid having between about 12 and about 20 carbon atoms.

For a more complete understanding of the present invention, reference is made to the following detailed description and accompanying examples.

BRIEF DESCRIPTION OF THE DRAWINGS

The (FIGS. 1A and 1B) of the drawings are charts comparing lubricity values for various lubricant compositions.

DETAILED DESCRIPTION OF THE PREFERRED EMBODIMENTS

Figure 1A:
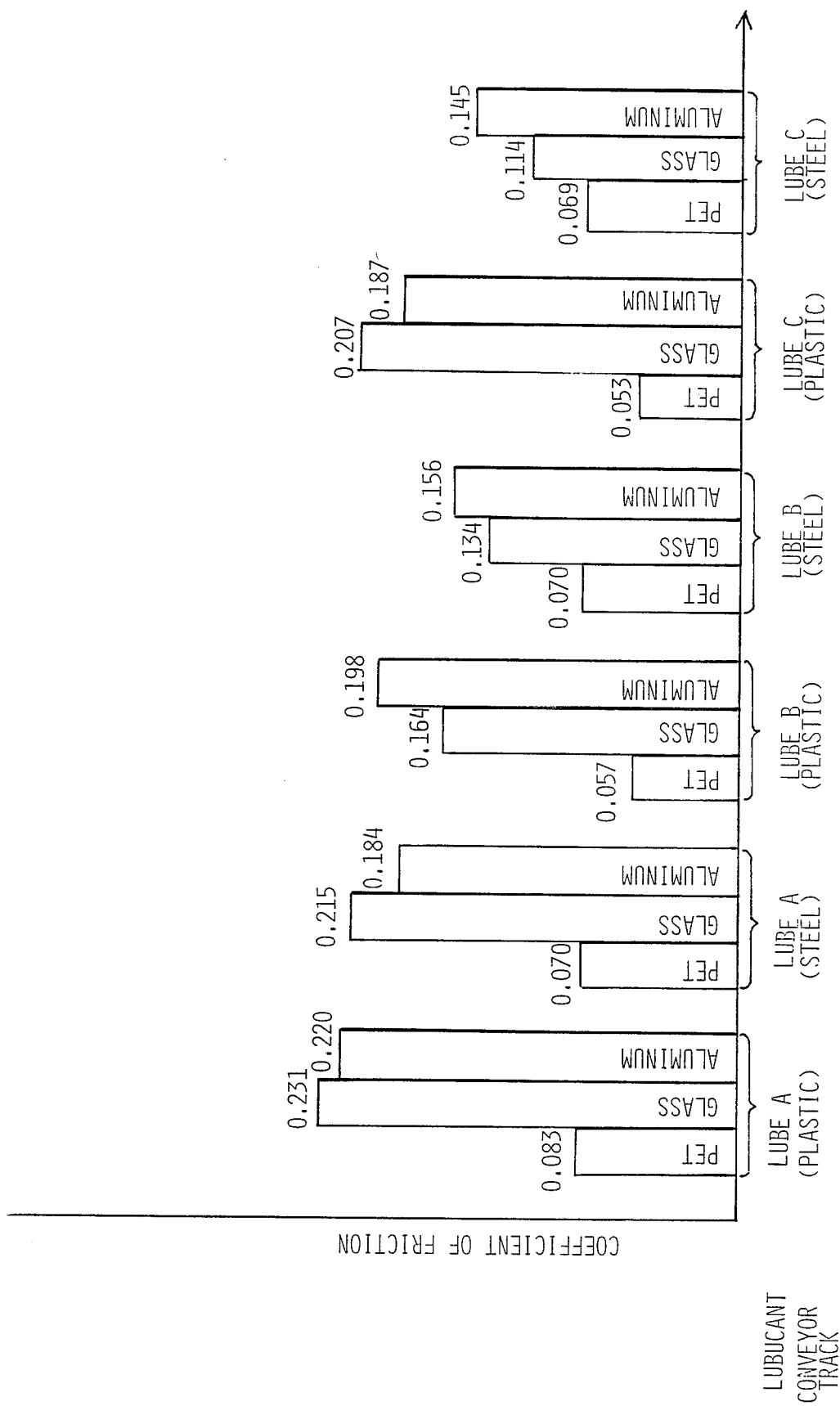
Figure 1B:
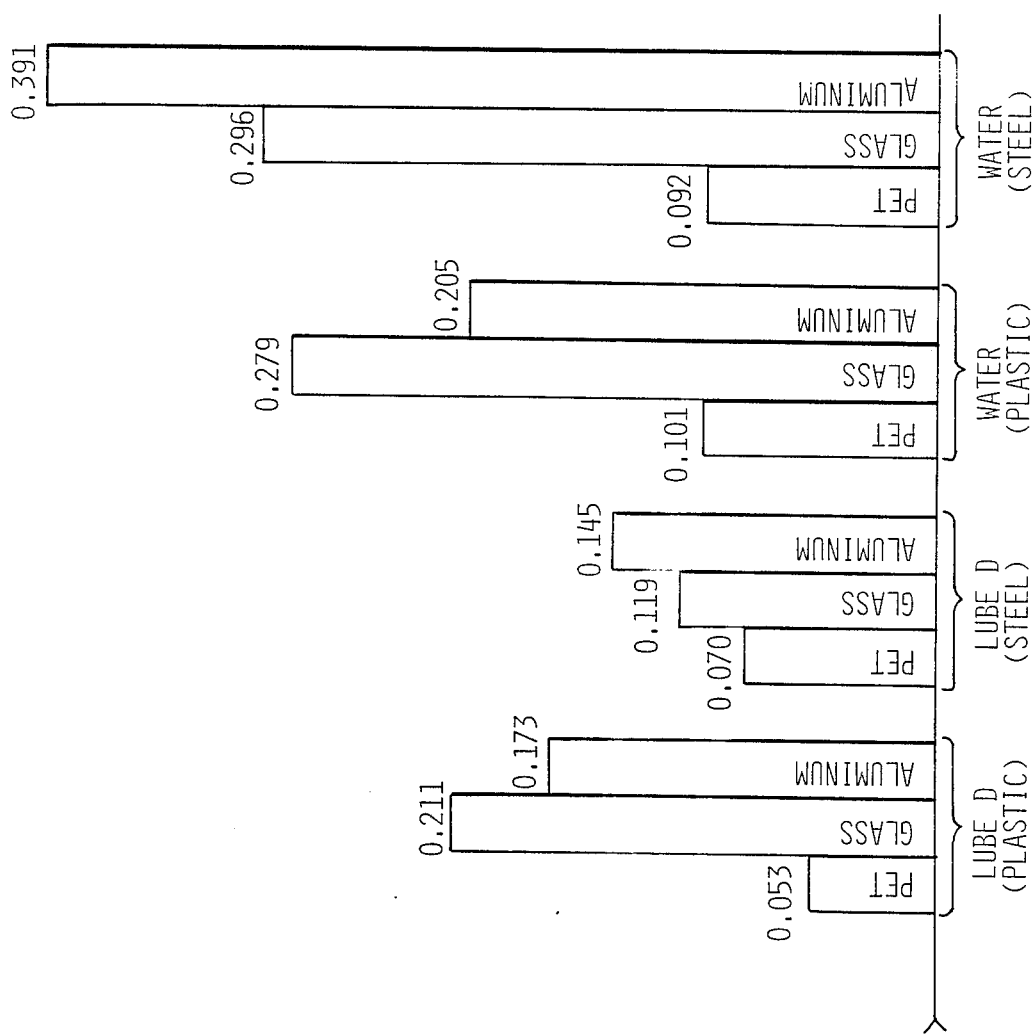

In accordance with the present invention and as noted in this application, conveyor cleaner-lubricants are prepared containing anionic surfactants and aluminum salts with other optional components as desired. Additionally, conveyor lubricants of the present invention exhibit excellent acid resistance and good soil removal. Finally, it has been found that the synergistic effect exhibited between aluminum salts and anionic surfactants such as the alpha-olefin sulfonates appear to counteract the hard-water sensitivity of additives such as fatty acids.

Various anionic surfactants may be employed in the water-soluble lubricant of the present invention. The anionic surfactant chosen is selected for its lubricating capability and its ability to solubilize with the aluminum salt in an aqueous or organic polar medium. The anionic surfactant employed in the water-soluble lubricant concentrate and lubricant composition made therefrom is selected from the group consisting of alpha-olefin sulfonates, sulfonates of ethoxylated linear alcohols, alkyl aryl sulfonates, napthalene sulfonates and mixtures thereof. The sulfonates of ethoxylated linear alcohols which can be employed in the present invention have the general formula:

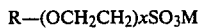

R—(OCH$_2$CH$_2$)$_x$SO$_3$M wherein x is an integer between about 1 and about 5 and M is an anion selected from the group consisting of alkali metals, an amine cation, an ammonium cation and mixtures thereof and R is a hydrocarbon radical having between 12 and 15 carbon atoms, and mixtures thereof. Representative of the useful alkali metal cations are sodium, potassium, as well as mixtures thereof.

The alkyl aryl sulfonates which can be employed in the present invention include those having the general formula:

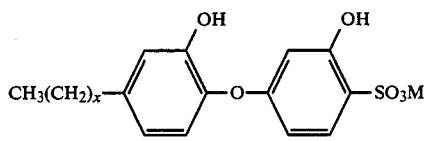

wherein x is an integer between about 6 and 12 and M is an anion selected from the group consisting of alkali metals, amine cations, ammonium cations and mixtures thereof.

The naphthalene sulfonates which can be employed in the present invention have the general formula:

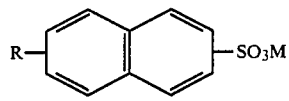

wherein R is a hydrocarbon radical having between 8 and 10 carbon atoms and M is an anion selected from the group consisting of alkali metals, amine cations, ammonium cations and mixtures thereof.

Alpha-olefin sulfonates are the preferred surfactant in the present invention. Where alpha-olefin sulfonates are employed, they are, preferably, selected from the group consisting of C$_{12}$ to C$_{18}$ alpha-olefin sulfonates and mixtures thereof.

Alpha-olefin sulfonates are well known in commercially available products. Generally, they are available as alkali metal salts. The alpha-olefin sulfonates contemplated for use herein can be represented by the following formula:

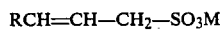

RCH=CH—CH$_2$—SO$_3$M wherein M is either an alkali metal, amine cation or ammonium cation as well as mixtures thereof and R is an unsubstituted hydrocarbon radical ranging from C$_9$ to C$_{15}$, and mixtures thereof. Representative of the useful alkali metal cation are sodium and potassium, as well as mixtures thereof.

In practicing the present invention, the preferred alpha olefin sulfonate is a C$_{14}$ to C$_{18}$ sodium alpha olefin sulfonate as well as mixtures thereof. Such compounds, as noted, are well known and commercially available. Such compounds can be obtained from Stepan Chemical Company under the name BIO-TERGE AS-40, which is a 40 percent aqueous solution of C$_{14}$ to C$_{16}$ sodium alpha olefin sulfonate. Another source for such material is Alcolac, Inc. which markets a 30 percent aqueous solution of C$_{16}$ to C$_{18}$ sodium alpha olefin sulfonates under the trade name SIPONATE A-167.

The anionic surfactant is present in the concentrate in an amount between about 20 to about 40 percent by weight based on the total weight of the concentrate.

The carrier employed in the lubricant concentrate and, in the composition made therefrom, is, preferably, water. It is also possible, in accordance with this invention, to use a water-soluble solvent such as alkanol or polyhydric alcohol as the vehicle or carrier for the surfactant. The water-soluble solvent may be admixed with water to define the carrier for the surfactant. Representative solvents which can be employed in the present invention include, for example, ethanol, propanol, butanol, ethylene glycol, propylene glycol, diethylene glycol and the like, as well as mixtures thereof.

The carrier is present in the concentrate in an amount sufficient to constitute the balance of the concentrate. The amount is generally between about 10 and about 95 percent by weight based on the total weight of the concentrate. Preferably, the carrier is present in an amount between about 60 and about 80 percent by weight based on the total weight of the concentrate.

The lubricant concentrate of the present invention also contains a salt of aluminum selected from the group consisting of aluminum sulfate, aluminum nitrate, aluminum chloride and mixtures thereof, as well as the hydrated mixed salt complex of potassium aluminum sulfate/aluminum sulfate having the general formula:

$$KAl(SO_2)_2-Al(SO_4)_3-MH_2O$$

wherein M is an integer from about 16 to 20 can also be successfully employed in this invention. In the preferred embodiment, aluminum sulfate is employed.

The water-soluble aluminum salt is employed in the present invention in an amount between 0.5 and 15 percent by weight based on the total weight of the concentrate. In the preferred embodiment, the amount of aluminum salt is between about 0.5 and about 5 percent by weight based on the total weight of the concentrate.

Because of the insolubility of aluminum hydroxide, the composition and diluent are, preferably, slightly acidic to prevent formation of the hydroxide of aluminum from the aluminum salt. Thus, the concentrate and diluted composition can include compounds to provide a solution pH between about 4.0 and about 6.0. Preferably, these compounds are weak acids selected from the group consisting of citric acid, acetic acid, glycolic acid, and mixtures thereof.

The addition of the aluminum salt has been found to unexpectedly improve the lubricity of the composition. Additionally, the addition of the aluminum salt has been found to unexpectedly improve the hard water sensitivity of the composition, thereby preventing the precipitation of fatty acids as the calcium and magnesium salts.

Optionally, the lubricant concentrate and composition of the present invention can include various fatty acid additives. The fatty acids which are preferably employed in the concentrate and composition of the present invention are those selected from the group consisting of the $C_{12}$ to $C_{20}$ saturated or unsaturated carboxylic acids and mixtures thereof. These materials are, preferably, present in their neutralized forms; for example, soaps. Such soaps are described in U.S. Pat. No. 3,860,521 to Aepli and U.S. Pat. No. 4,274,973, both of which are herein incorporated by reference. Examples of fatty acids which are particularly efficacious in this application as the $C_{16}$ to $C_{18}$ carboxylic acids and mixtures thereof. Preferably, the fatty acids employed are selected from the group consisting of neutralized oleic acids, neutralized palmitic acids and mixtures thereof. When employed, the fatty acid is present in the concentrate in an amount between about 0.1 and about 10.0 percent by weight; preferably between about 0.25 and about 1.25 percent by weight based on the total weight of the composition.

The ability to add fatty acids to the conveyor lubricant composition and concentrate of the present invention was quite unexpected. It has been, heretofore, expected that added fatty acids would precipitate out of solution when exposed to aluminum salts or high levels of water hardness. However, in the presence of the anionic surfactants of the present invention, it was found that a clear solution could be produced which employed fatty acids. Without being bound to any theory, it is believed that the anionic surfactants and aluminum salts have a synergistic effect which inhibits precipitation of the fatty acids. It was also found that presence of the anionic surfactants, in combination with aluminum salts, eliminates fatty acid precipitation in solutions having high levels of water hardness, both in the concentrate and in the diluted conveyor composition.

The lubricant concentrate may, also, contain additional minor amounts of other ingredients, such as nonionic surfactants to improve cold water stability, as well as corrosion inhibitors and the like. Generally, nonionic surfactants, where employed, are present in an amount ranging from about 0.1 percent, by weight, to about 10 percent, by weight, based on the total weight of the concentrate. Preferably, nonionic surfactants, where employed, are present in an amount ranging from about 0.5 percent to about 8 percent, by weight, based on the total weight of the concentrate.

The nonionic surfactant optionally employed in the present invention is one with a high ethoxylation to prevent clouding in the diluent. The nonionic surfactants which are advantageously employed in the compositions of the present invention are basically the polyoxyalkalines adducts of hydrophobic bases wherein the oxygen/carbon atom ratio in the oxyalkaline portion of the molecule is greater than 0.40. Those compositions which are condensed with hydrophobic bases to provide a polyoxyalkaline portion having an oxygen/carbon atom ratio greater than 0.40 include ethylene oxide, butadiene dioxide and glycidol, mixtures of these alkaline oxides with each other and with minor amounts of propylene oxide, butylene oxide, amylene oxide, styrene oxide, and other higher molecular weight alkaline oxides. Ethylene oxide, for example, is condensed with the hydrophobic base in an amount sufficient to impart water dispersability or solubility and surface active properties to the molecule being prepared. The exact amount of ethylene oxide condensed with the hydrophobic base will depend upon the chemical characteristics of the base employed and is readily apparent to those of ordinary skill in the art relating to the synthesis of oxyalkylene surfactant condensates. Typical hydrophobic bases which can be condensed with ethylene oxide in order to prepare nonionic surface active agents include mono- and polyalkylphenols, polyoxypropylene condensed with a base having from about 1 to 6 carbon atoms and at least one reactive hydrogen atom, fatty acids, fatty amines, fatty amides and fatty alcohols. The hydrocarbon ethers such as benzyl or lower alkyl ether of the polyoxyethylene surfactant condensates are also advantageously employed in the compositions of the invention.

Among the suitable nonionic surface active agents are the polyoxyethylene condensates of alkyl phenols having from about 6 to 20 carbon atoms in the alkyl portion and from about 5 to 30 ethenoxy groups in the polyoxyethylene radical. The alkyl stituent on the aromatic nucleus may be octyl, diamyl, n-dodecyl, polymerized propylene such as propylene tetramer and trimer, isoctyl, nonyl, etc. The benzyl ethers of the polyoxyethylene condensates of monoalkyl phenols impart good properties to the compositions of the invention. A typical product corresponds to the formula:

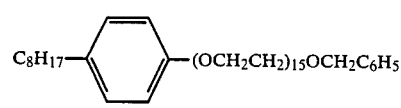

Higher polyalkyloxyethylated phenols corresponding to the formula:

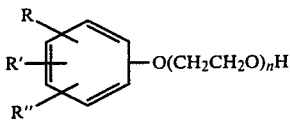

wherein R is hydrogen or an alkyl radical having from about 1 to 12 carbon atoms, R' and R" are alkyl radicals having from about 6 to 16 carbon atoms and n has a value from about 10 to 40, are also suitable as nonionic surfactants. A typical oxyethylated polyalkyl phenol is dinonyl phenol condensed with 14 moles of ethylene oxide.

Other suitable nonionic surface active agents are cogeneric mixtures of conjugated polyoxyalkaline compounds containing in their structure at least one hydrophobic oxyalkaline chain in which the oxygen/carbon atom ratio does not exceed 0.40 and at least one hydrophilic oxyalkaline chain in which the oxygen/carbon atom ratio is greater than 0.40.

Polymers of oxyalkaline groups obtained from propylene oxide, butylene oxide, amylene oxide, styrene oxide, mixtures of such oxyalkaline groups with each other and with minor amounts of polyoxyalkaline groups obtained from ethylene oxide, butadiene dioxide, and glycidol are illustrative of hydrophobic oxyalkaline chains having an oxygen/carbon atom ratio not exceeding 0.40. Polymers of oxyalkaline groups obtained from ethylene oxide, butadiene dioxide, glycidol, mixtures of such oxyalkaline groups with each other and with minor amounts of oxyalkaline groups obtained from propylene oxide, butylene oxide, amylene oxide, and styrene oxide are illustrative of hydrophilic oxyalkylene chains having an oxygen/carbon atom ratio greater than 0.40.

Further suitable nonionic surface active agents are the polyoxyethylene esters of higher fatty acids having from about 8 to 22 carbon atoms in the acyl group and from 8 to 30 ethanoxy units in the oxyethylene portion. Typical products are the polyoxyethylene adducts of tall oil, rosin acids, lauric, stearic and oleic acids and the like. Additionally, nonionic surface active agents are the polyoxyethylene condensates of higher fatty acid amines and amides having from about 8 to 22 carbon atoms in the fatty alkyl or acyl group and about 10 to 30 ethanoxy units in the oxyethylene portion. Illustrative products are coconut oil, fatty acid amines and amides condensed with about 10 to 30 moles of ethylene oxide.

Other suitable polyoxyalkaline nonionic surface active agents are the alkaline oxide adducts of higher aliphatic alcohols and thioalcohols having from about 8 to 22 carbon atoms in the aliphatic portion and about 3 to 50 carbon atoms in the oxyalkylene portion. Typical products are the synthetic fatty alcohols, such as n-decyl, n-undecyl, n-dodecyl, n-tridecyl, n-tetradecyl, n-hexadecyl, n-octdadecyl and mixtures thereof condensed with 3 to 50 moles of ethylene oxide, a mixture of normal fatty alcohols condensed with 8 to 20 moles of ethylene oxide and capped with a benzene group, an alkyl group, a mixture of normal fatty alcohols condensed with 10 to 30 moles of a mixture of ethylene and propylene oxides, a mixture of several fatty alcohols condensed sequentially with 2 to 20 moles of ethylene oxide and 3 to 10 moles of propylene oxide, in either order; or a mixture of normal fatty alcohols condensed with a mixture of propylene and ethylene oxides, in which the oxygen/carbon atom ratio is less than 0.40 followed by a mixture of propylene and ethylene oxides in which the oxygen/carbon atom ratio is greater than 0.40 or a linear secondary alcohol condensed with 3 to 30 moles of ethylene oxide, or a linear secondary alcohol condensed with a mixture of propylene and ethylene oxides, or a linear secondary alcohol condensed with a mixture of ethylene, propylene and higher alkylene oxides.

Optional corrosion inhibitors such as sodium nitrite and the like can be included in suitable amounts provided there are no detrimental effects to the composition or concentrate.

In preparing the lubricant concentrate, the various compounds are combined and suitably mixed.

In preparing a conveyor lubricant composition from the conveyor lubricant concentrate, the concentrate is diluted with tap water in a respective ratio of between about 1 part and about 50 parts and about 1000 parts water. The lubricant composition will, preferably, contain from about 0.001 percent, by weight, to about 0.1 percent, by weight, of the concentrate.

The present invention also contemplates a conveyor lubricant composition which comprises the following:
(a) from about 0.2 to about 0.4 percent by weight anionic surfactant selected from the group consisting of alpha olefin sulfonates, alkyl aryl sulfonates, alcohol ethoxylated sulfonates, napthalene sulfonates and mixtures thereof;
(b) from about 0.005 to about 0.05 percent by weight of a water soluble salt of aluminum selected from the group consisting of aluminum nitrate, aluminum sulfate, aluminum chloride, potassium/aluminum sulfate and mixtures thereof; and
(c) an aqueous diluent.

The conveyor lubricant optionally may also contain from about 0.005 to about 2.0 percent by weight of a fatty acid.

The lubricants, in use, are applied by any conventional technique such as spraying, immersion, and the like.

In addition to preparation of concentrates and lubricants derived therefrom, it has further been found that the lubricant concentrate of the present invention can be incorporated into conventional fatty acid soap lubricants to increase lubricity and enhance hard water stability of those compositions. Thus, the present invention contemplates the improvement in such formulations by the incorporation of the present lubricant concentrate or the incorporation of alpha olefin sulfonates in admixture with aluminum salts thereinto.

For a more complete understanding of the present invention, reference is made to the following examples. In the examples which are to be construed as illustrative, rather than limitative of the invention, all parts are by weight, absent contrary indications.

EXAMPLE I

This example illustrates the preparation of a concentrate in accordance with the present invention.

A lubricant concentrate is prepared directly from a composition containing 40 parts sodium alpha olefin sulfonate having a carbon chain length of $C_{14}$ to $C_{16}$ and 60 parts of water. This is a commercially available product known as BIO-TERGE AS-40.

EXAMPLE II

This example illustrates the preparation of a concentrate in accordance with the present invention.

Into a suitable vessel, equipped with agitation means is added the following:

| Ingredient | Amount |
| --- | --- |
| Water | 67.5 |
| Aluminum Sulfate | 2.5 |
| AOS[1] | 30.0 |

[1]30 parts of BIO-TERGE AS-40 (effective amount of 12 parts of sodium alpha olefin sulfonate)

EXAMPLE III

Example II is repeated using the following formulation:

| Ingredient | Amount |
| --- | --- |
| Water | 67.5 |
| AOS[1] | 30.0 |
| Aluminum Sulfate | 2.5 |

[1]Present is 30 parts SIPONATE A-167

EXAMPLE IV

A concentrate suitable as a conveyor lubricant is prepared using the following formulation:

| Ingredient | Amount |
| --- | --- |
| Water | 66.0 |
| Soap | 0.75 |
| AOS[1] | 30.0 |
| Aluminum Sulfate | 2.5 |
| Citric Acid | 0.75 |

[1]BIO-TERGE AS-40

EXAMPLE V

Following the procedure of Example II, a concentrate is prepared from the following formulation:

| Ingredient | Amount |
| --- | --- |
| Water | 64.5 |
| AOS[1] | 30 |
| Aluminum Sulfate | 2.5 |
| Nonionic Surfactant[2] | 3.0 |

[1]BIO-TERGE AS-40
[2]A heterite ethylene oxide-propylene oxide adduct of a mixture $C_{12}$ to $C_{18}$ monofunctional alcohols defined in U.S. Pat. No. 3,770,701 and sold commercially by BASF Wyandotte Corporation under the name PLURAFAC B26.

EXAMPLE VI

Following the procedure of Example II, a concentrate is prepared from the following formulation:

| Ingredient | Amount |
| --- | --- |
| Water | 63.5 |
| AOS[1] | 30.0 |
| Aluminum Sulfate | 2.5 |
| Solvent[2] | 4.0 |

[1]BIO-TERGE AS-40
[2]DOWANOL DPM

EXAMPLE VII

The concentrates prepared in Examples II through V are analyzed and each will yield a clear solution. Upon dilution, each concentrate is found to provide clear solutions having enhanced lubricity as compared to Example I.

EXAMPLE VIII

A comparison of various lubricants was undertaken. A typical fatty acid lubricant was prepared according to the following method.

A lubricant containing alpha olefin sulfonate was prepared by preparing an alpha olefin sulfonate lubricant concentrate according to the method outlined in Example I of U.S. Pat. No. 4,604,220 to Stanton which is herein incorporated by reference and diluting it to 0.75 percent in deionized water. This material was designated as Lubricant A. An aluminum sulfate/alpha olefin sulfate lubricant according to the present invention was prepared by diluting the concentrate set forth in Example IV to provide a concentrate concentration of 0.75 percent in deionized water. This material was designated as Lubricant B.

A third lubricant composition was prepared from an aqueous concentrate containing 25 percent by weight alpha olefin sulfonates, 10 percent by weight neutralized fatty acids, 5 percent sodium ethylene diamine tetraacetate, and 4 percent nonionic-type surfactants. The concentrate was diluted to provide a lubricant composition of 0.75 percent concentrate is deionized water. This composition was designated as Lubricant C.

A fourth lubricant composition was prepared from a concentrate from which alpha-olefin sulfonates were omitted. the concentrate contained 15 percent by weight neutralized fatty acids, 8 percent by weight sodium ethylene diamine tetraacetate and 4 percent nonionic-type surfactants. The concentrate was diluted to provide a lubricant composition containing 0.75 percent concentrate in deionized water. This composition was designated as Lubricant D.

As a control, water containing no additives was also employed as a potential lubricant.

Each lubricant was applied to a 10 foot section of a beverage bottle conveyor having representative plastic and stainless steel conveying chains. The bottle conveyor is powered by an appropriate motor. A load cell was employed to measure the horizontal pull or force exerted on containers placed on the conveyor. A recorder connected to the load cell was used to chart the horizontal force on the containers exerted as diluted lubricant is sprayed on the surface of the moving conveyor.

The conveyor was under a load of 12 containers. Each container was filled with water. Containers employed were commercially available filled units constructed of either glass, aluminum or PET plastic. Each of the containers were restricted from forward movement such that the conveyor slides under the containers while the containers remain stationary. The coefficient of friction for each container type and conveyor surface was measured as the horizontal force divided by the vertical force exerted by the weight of the containers. The coefficient of frictions for the various containers and various lubricants on various conveyors are set forth in the drawings.

As can be seen from the data set forth in the drawings the lubricant of the present invention exhibited levels of lubricity essentially equal to or greater than fatty acid lubes and alpha olefin sulfonate lubes when used on stainless steel conveyors with aluminum or plastic PET containers. When employed on stainless steel chains having glass containers, the aluminum/AOS lube prepared according to the present invention showed significantly greater lubricity than the lubricants containing alpha olefin sulfonates alone and lubricity essentially equal to lubricants containing only fatty acids or lubricants containing mixtures of fatty acids and alpha olefin sulfonates. Furthermore, when used on stainless steel conveyors, Lubricant B, the enhanced lubricant of the present invention containing aluminum salts, showed more consistent lubricating values when used on containers composed of varying material as opposed to those composed of fatty acids alone such as Lubricant D, alpha olefin sulfonates alone, such as Lubricant A, or mixtures of fatty acids and alpha olefin sulfonates such as Lubricant C.

The results of the lubricants employed on plastic conveyors is also set forth in the drawings. As can be seen from that data, the lubricant of the present invention exhibited greater lubricity than lubricants containing only alpha olefin sulfonates such as Lubricant A when used with any type of container. The enhancement in lubricity was particularly marked when employed with glass and PET plastic containers.

As can be seen from the results in the drawings the present invention provided a lubricating value greater than that of fatty acid lubricants such as Lubricant D when employed with either plastic containers or glass containers. Thus, the lubricant of the present invention appears to be more uniformly efficacious on a variety of chain surfaces than other conventional lubricants; particularly when employed with glass and PET plastic bottles.

I claim:

1. A water-soluble lubricant concentrate adapted to be admixed with water to provide a lubricant composition having enhanced lubricity and hard water stability for facilitating transportation of containers on a conveyor, comprising:
   (a) an anionic surfactant selected from the group consisting of alpha-olefin sulfonates, sulfonates of ethoxylated alcohols, alkyl aryl sulfonates, naphtalene sulfonates, and mixtures thereof;
   (b) a carrier for the anionic surfactant selected from the group consisting of water, ethanol, propanol, butanol, ethylene glycol, propylene glycol, diethylene glycol, and mixtures thereof; and
   (c) a water soluble salt of aluminum selected from the group consisting of aluminum sulfate, aluminum nitrate, aluminum chloride, polyhydrates of potassium aluminum sulfate/aluminum sulfate complexes and mixtures thereof.

2. The water-soluble lubricant concentrate of claim 1 wherein the anionic surfactant is an alpha-olefin sulfonate having the general formula:

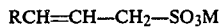

wherein R is selected from the group consisting of an unsubstituted organic radical having from 9 to 15 carbon atoms and mixtures thereof and M is selected from the group consisting of alkali metal cations, ammonium cations, amine cations, and mixtures thereof.

3. The lubricant concentrate of claim 2 wherein M is sodium.

4. The lubricant concentrate of claim 1 wherein the anionic surfactant is present in an amount between about 5 and about 50 percent by weight based on the total weight of the concentrate.

5. The lubricant concentrate of claim 1 further comprising a compound capable of maintaining a solution pH between about 4.0 and about 6.0.

6. The lubricant concentrate of claim 5 wherein the compound capable of maintaining a solution pH between about 4.0 and about 6.0 is selected from the group consisting of citric acid, acetic acid, glycidic acid and mixtures thereof.

7. The lubricant concentrate of claim 1 further comprising a nonionic surfactant.

8. The lubricant concentrate of claim 7 wherein the nonionic surfactant is selected from the group consisting of an ethylene oxide-propylene oxide adduct of a $C_{12}$ to $C_{18}$ monofunctional alcohol and mixtures thereof.

9. The lubricant concentrate of claim 1 further comprising a fatty acid selected from the group consisting of $C_{12}$ to $C_{20}$, saturated or unsaturated carboxylic acids and mixtures thereof.

10. The lubricant concentrate of claim 8 wherein the fatty acid is a neutralized fatty acid.

11. The lubricant concentrate of claim 10 wherein the fatty acid is selected from the group consisting of $C_{16}$ to $C_{18}$ carboxylic acids, and mixtures thereof.

12. The lubricant concentrate of claim 11 wherein the fatty acid is present in an amount between about 0.25 and about 1.25 percent by weight based on the total weight of the concentrate.

13. The lubricant concentrate of claim 1 comprising:
   (a) anionic surfactant present in an amount from about 5 to about 50 percent by weight of the concentrate;
   (b) carrier present in an amount from about 50 to about 95 percent by weight of the concentrate; and
   (c) water soluble salts of aluminum present in an amount from about 0.5 to about 15 percent by weight of the concentrate.

14. The water soluble lubricant concentrate of claim 13 wherein the anionic surfactant is an alpha-olefin sulfonate having the general formula:

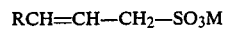

wherein R is selected from the group consisting of unsubstituted organic radicals having from 9 to 15 carbon atoms and mixtures thereof and M is selected from the group consisting of alkali metal cations, ammonium cations, amine cations, and mixtures thereof.

15. The lubricant concentrate of claim 13 wherein the anionic surfactant is present in an amount between about 8 and about 16 percent by weight based on the total weight of the concentrate.

16. The lubricant concentrate of claim 13 wherein the aluminum salt is present in an amount between about 0.5 and about 5 percent by weight based on the total weight of the concentrate.

17. The lubricant concentrate of claim 13 further comprising a nonionic surfactant present in an amount from about 0.1 to about 10 percent by weight of the concentrate.

18. The lubricant concentrate of claim 17 wherein the nonionic surfactant is present in an amount between about 0.5 to about 8.0 percent by weight based on the total weight of the concentrate.

19. The lubricant concentrate of claim 18 wherein the nonionic surfactant is present in an amount between about 0.5 and about 2.5 percent by weight based on the total weight of the concentrate.

20. The lubricant concentrate of claim 12 wherein the nonionic surfactant is selected from the group consisting of an ethylene oxide-propylene oxide adduct of a $C_{12}$ to $C_{18}$ monofunctional alcohol and mixtures thereof.

21. The lubricant concentrate of claim 10 further comprising a fatty acid selected from the group consisting of $C_{12}$ to $C_{20}$ carboxylic acids and mixtures thereof, the fatty acid being present in an amount from about 0.1 to about 1.5 percent by weight of the concentrate.

22. The lubricant concentrate of claim 21 wherein the fatty acid is selected from the group consisting of $C_{16}$ to $C_{18}$ carboxylic acids and mixtures thereof.

* * * * *